Apr. 24, 1923.

C. F. McBEE 1,452,565

BINDING MACHINE

Filed Dec. 30, 1918

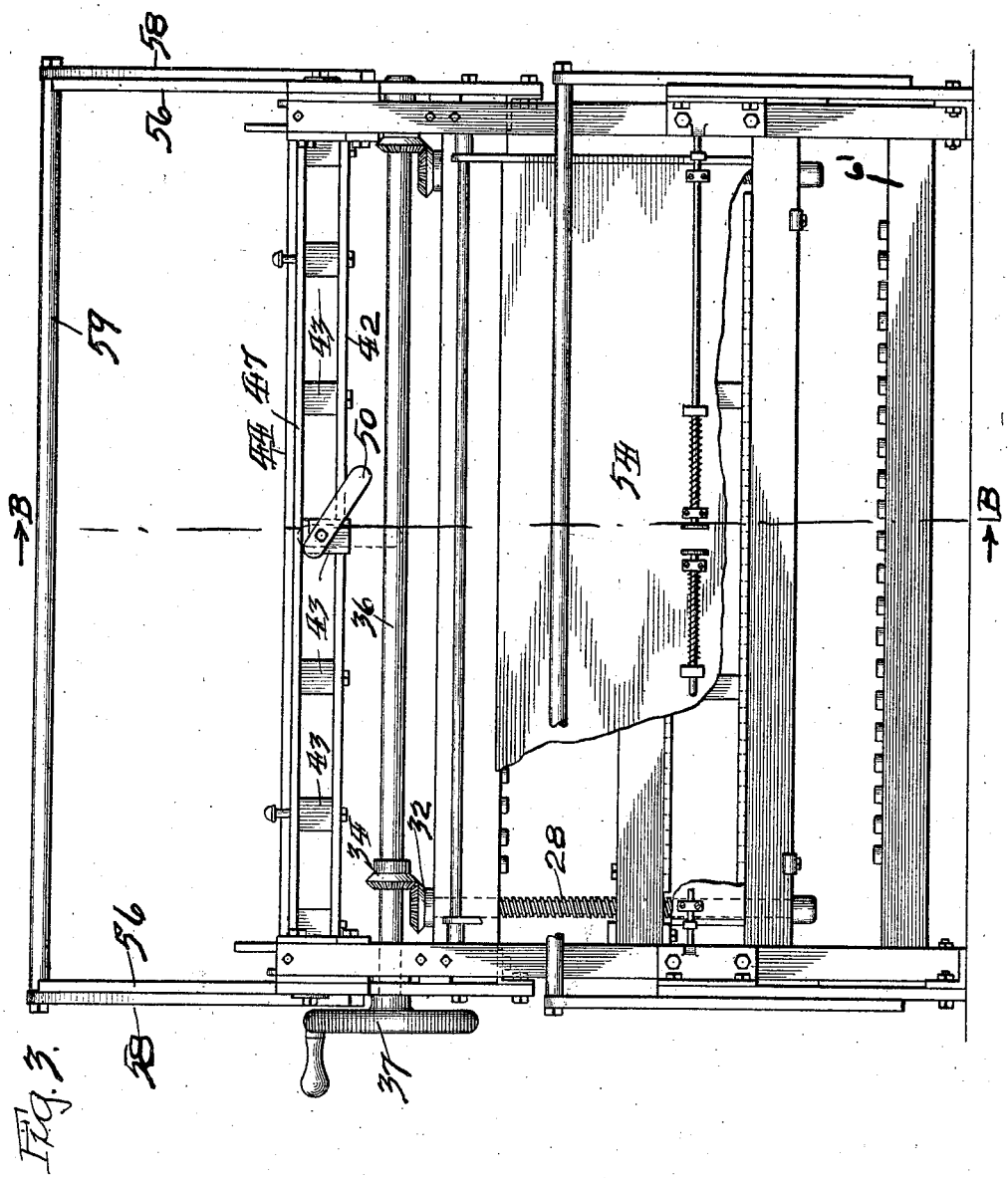

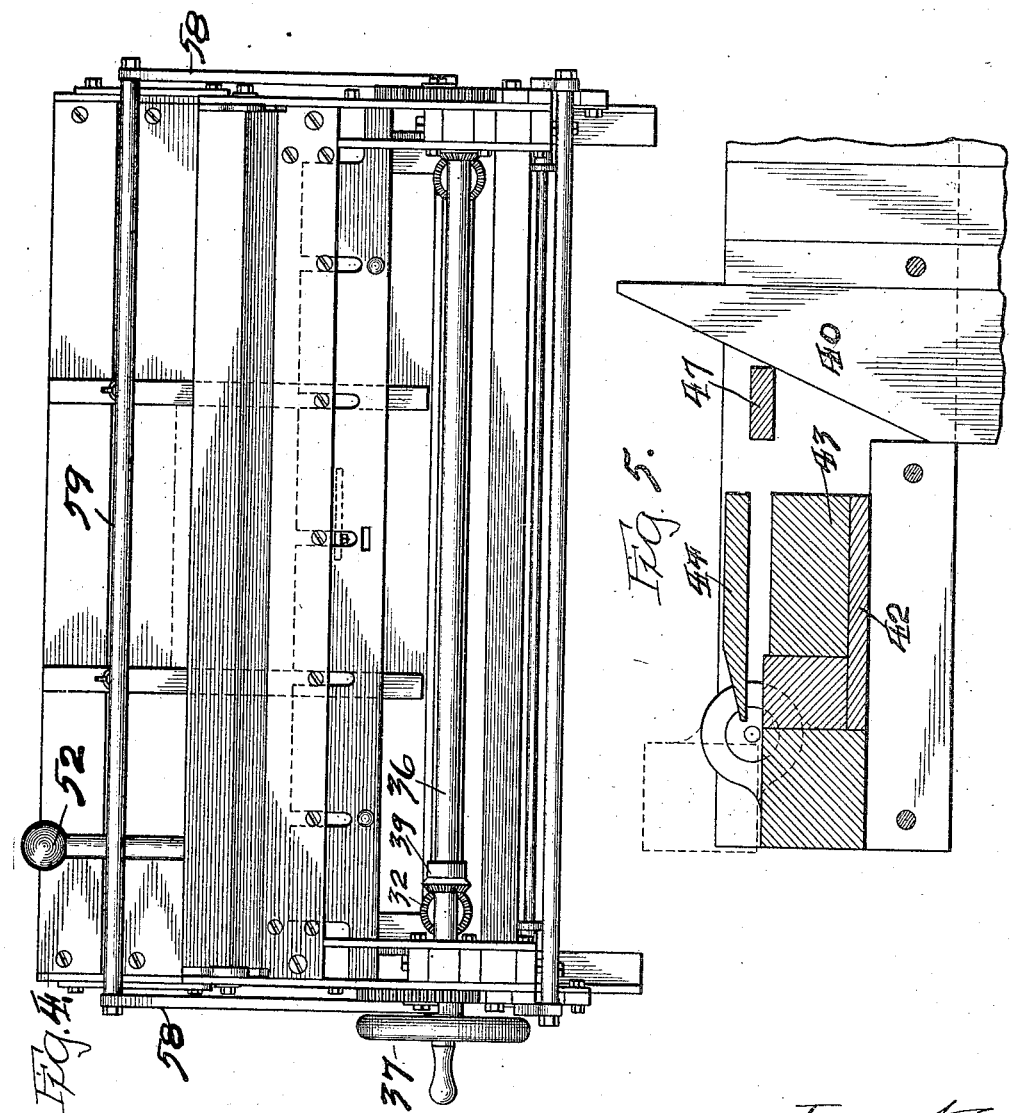

Apr. 24, 1923.
C. F. McBEE
1,452,565
BINDING MACHINE
Filed Dec. 30, 1918
7 Sheets-Sheet 6
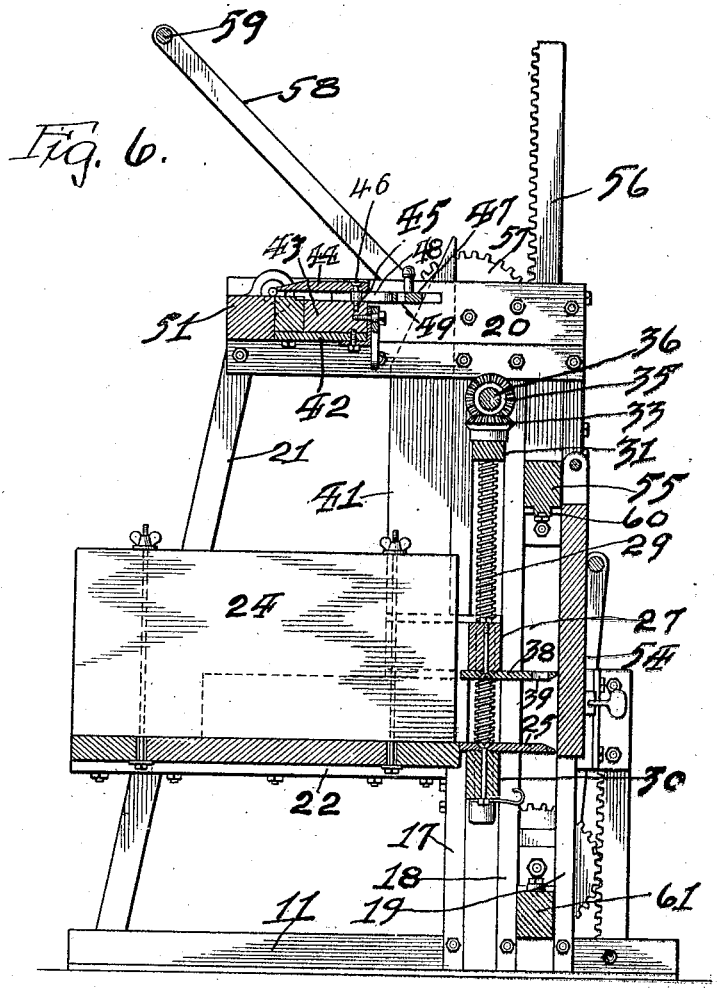
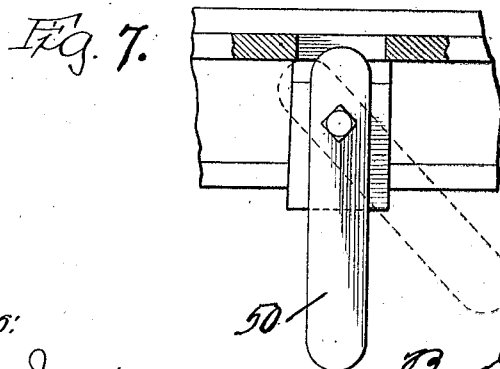

Apr. 24, 1923.

C. F. McBEE 1,452,565

BINDING MACHINE

Filed Dec. 30, 1918

Witness:
Leo J. Dukan

Inventor:
Charles F. McBee
By Dodson & Roe
Attys

Apr. 24, 1923.
C. F. McBEE
1,452,565
BINDING MACHINE
Filed Dec. 30, 1918
7 Sheets-Sheet 7
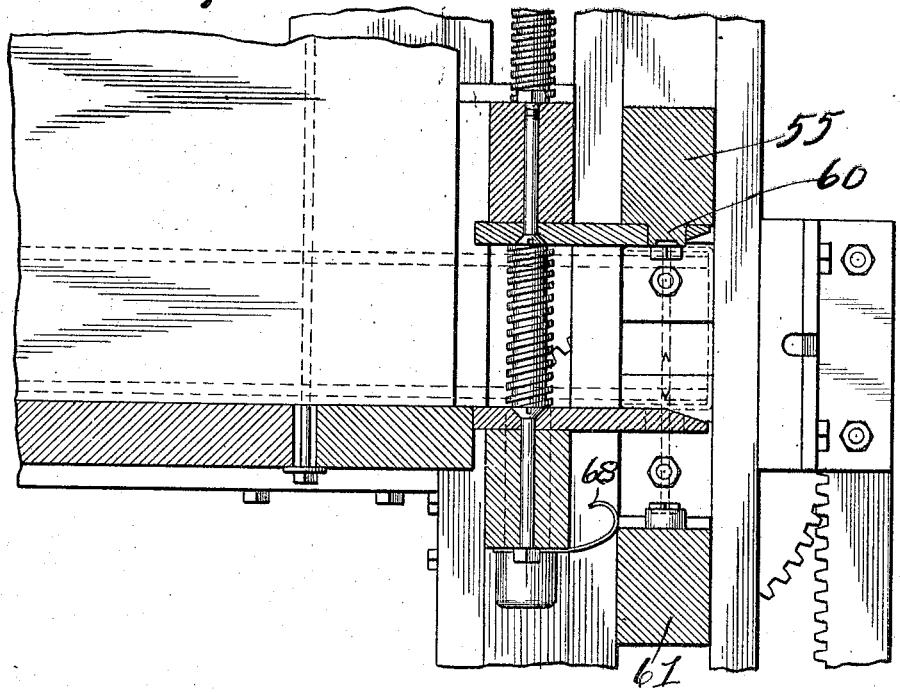
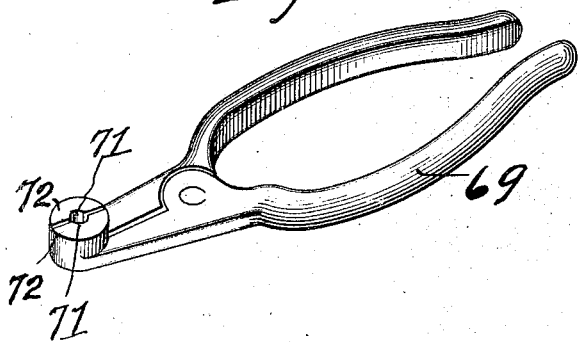
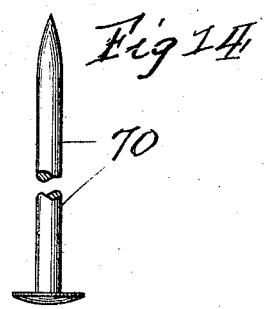
Inventor
Charles F. McBee
By Dodson and Doe
Attys.
Witness
Leo. Dumais.

Patented Apr. 24, 1923.

1,452,565

UNITED STATES PATENT OFFICE.

CHARLES F. McBEE, OF ATHENS, OHIO, ASSIGNOR TO THE McBEE BINDER COMPANY, OF ATHENS, OHIO.

BINDING MACHINE.

Application filed Decemebr 30, 1918. Serial No. 269,010.

*To all whom it may concern:*

Be it known that I, CHARLES F. McBEE, a citizen of the United States, residing at Athens, in the county of Athens and State of Ohio, have invented a certain new and useful Improvement in Binding Machines, of which the following is a specification.

The object of my invention is to provide a binding machine adapted to receive sheets to be bound, covers and a back, and to securely bind them together by means of ordinary wire nails, or the like. A further object is to provide such a machine adapted to measure and shape the back to be used for the particular volume under construction irrespective of its thickness.

Heretofore it has been considered impractical to bind volumes with nails and other means much more expensive have been employed, such as perforating and riveting, or sewing, or the like. My invention is so simple and practical that it completely negatives the necessity of such methods and nails can be used for the binding means, even if the covers and backs are formed of a sheet metal, as is often the case.

My invention consists of certain details of construction hereinafter set forth, pointed out in my claims, and illustrated in the accompanying drawings, in which Figure 1 shows a perspective view of my device, a part of the evener board being broken away;

Figure 3 shows a front elevation view of the same, a part of the evener board being broken away;

Figure 4 shows a plan view of my device;

Figure 5 shows a detail view, in section, of a part of my back shaping device;

Figure 6 shows a vertical sectional view of my device;

Figure 7 shows a detail view of a part of my back shaping device;

Figure 11 shows an enlarged detail view, in section, of a part of my device;

Figure 12 shows an auxiliary means I employ for holding a nail in proper position as it is being driven into the volume; and Figures 13 and 14 show a nail and locking clasp therefor which I employ if the nails are driven clear through the volume and locked.

Figure 1:
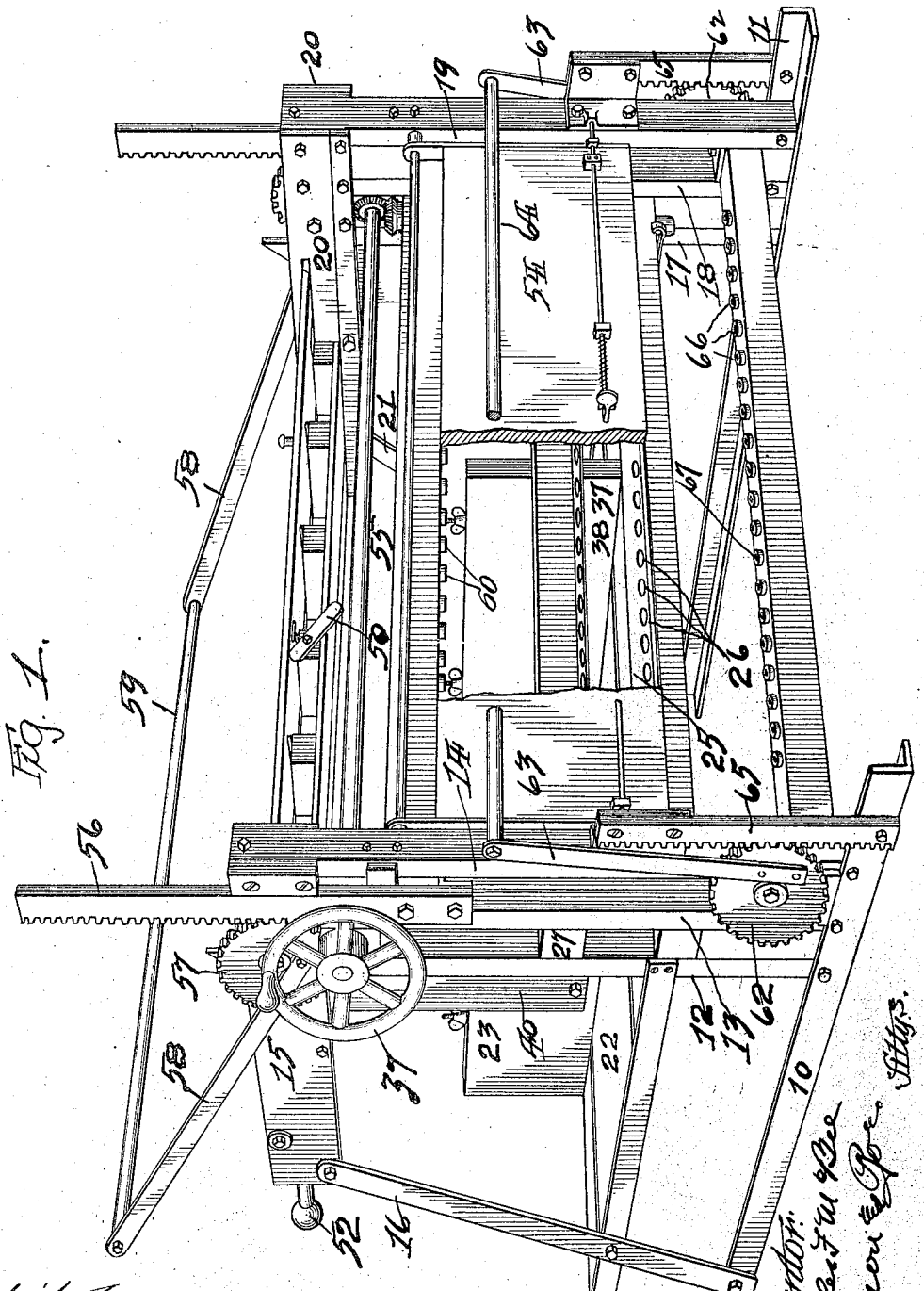
Figure 2:
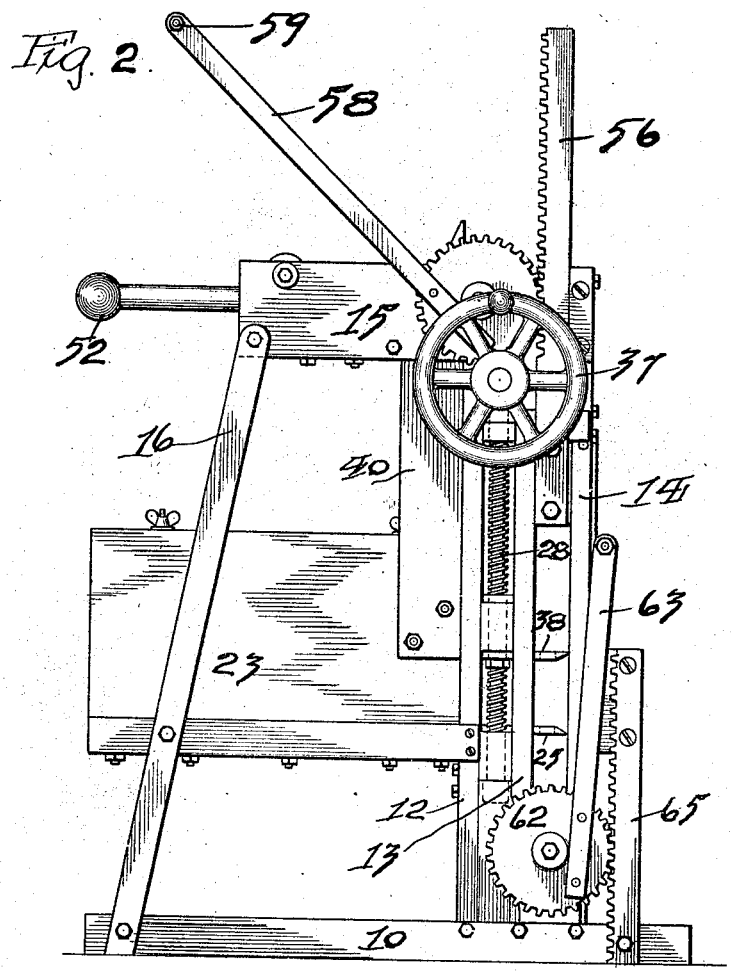
Figure 2 shows a side elevation view of my device.
Figure 8:
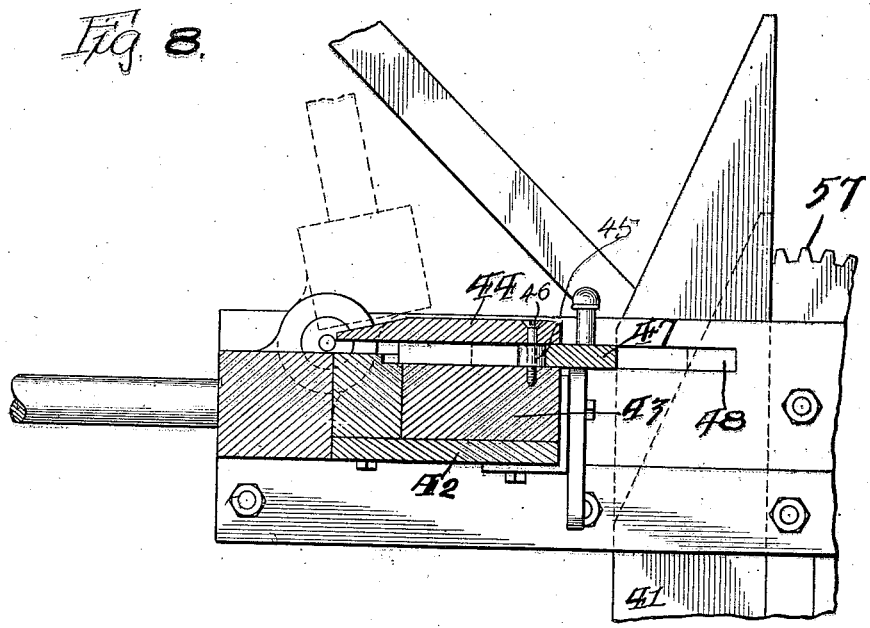
Figure 8 shows a detail view, partially in section, of the back shaping device.
Figure 9:
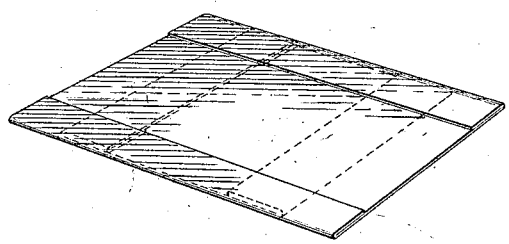
Figures 9 and 10 show detail views of a back before shaping and after it has been partially shaped.

Referring to the accompanying drawings, the reference numerals 10 and 11 are used to indicate the horizontal supports on which my machine is mounted. Extending vertically upward from the support 10 are three parallel standards 12, 13, and 14, spaced as shown, their upper ends being secured to a horizontal cross bar 15 which is connected at its rear with the support 10 by means of a connecting bar 16. The numerals 17, 18, and 19, indicate similar standards extending upwardly from the support 11 (and oppositely disposed to the standards on the support 10) their upper ends being secured to a horizontal cross bar 20 (in line with and exactly similar to the cross bar 15) which is connected with the support 11 by means of a connecting bar 21.

The numeral 22 indicates a receiving platform secured to the rear uprights 12 and 17 and the connecting bars 16 and 21, said platform being provided with adjustable sides 23 and 24. Extending forwardly from the platform 22 and between the standards on the two sides of the machine is a plate 25 provided with a row of orifices 26, as shown, and having its forward end beveled downwardly.

Mounted for upward and downward movement between the standards 12 and 13 and the standards 17 and 18, is a pressure bar 27 which is mounted on two screw shafts 28 and 29, one near each end thereof, said screw shafts being journaled in bearings in the cross bars 30 and 31, one of which is mounted below the platform 22 and the other near the upper part of the machine. Each of said screw shafts extends through the upper cross bar in which they are journaled and on their upper ends are secured pinions 32 and 33 which mesh with and are operated by pinions 34 and 35 respectively, mounted on a rotatable shaft 36 which is journaled in bearings secured between the standards 12 and 13, and 17 and 18 respectively. On one end of said shaft 36 I have secured a hand wheel 37. Extending forwardly from the pressure bar 27 is a plate 38 provided with a row of orifices 39 and having its forward end beveled upwardly, as shown, said plate 38 being exactly similar to the plate 25 and being in line therewith, but the row of orifices in the plate 38 are off-set from the row of orifices in the plate 25.

Secured to either side, and in the rear of the pressure bar 27 are plates 40 and 41, respectively, their upper ends being inclined rearwardly at a predetermined angle, said plates being exactly similar in every respect and designed to operate as companions. It is obvious the upward and downward movement of the pressure bar will raise and lower these plates. The numeral 42 indicates a base plate extending from the cross bar 15 to the cross bar 20.

On the upper surface of the said plate are a plurality of supports 43 and a second plate 44 is secured in spaced relation above the supports by means of ferrules 45 threaded on screw bolts 46 between the said plates. A third plate 47 is movably secured between the first two mentioned plates by means of slots 48 receiving the ferrules 45. The said third plate is adapted for forward and rearward movement between the first two mentioned plates and the slots in the third plate obviously limit its movement. In the central portion of the third plate I have provided an orifice 49 designed to receive a swinging weighted lever 50 secured to the central support 43. By this means I provide a positive determined setting for the movable plate which is necessary in one of the operations of forming the back for my volume as will be hereinafter explained.

The plate 44 extends a certain distance forward from its mounting and immediately in advance of its forward end, and on a line with the upper surfaces of the supports 43 is a rectangular bar 51, rotatably mounted at each of its ends, and provided with a handle 52, the fixed center for the rotation of the bar being immediately in advance of the end of the plate 44.

Figure 10:
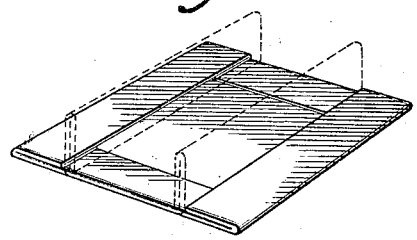

The inclined surfaces of the plates 40 and 41 are designed to be in the path of the movable plate 47 which by construction will have sufficient movement that it can always contact with the plates 40 and 41. As these plates 40 and 41 move with the pressure bar it is apparent that the thickness of the volume under construction will determine the point on the inclined surface of the plates which will contact with the rear surface of the plate 47. Thus in forming a back for the volume a strip of metal of a stock size to be used on any volume is thrust between the plate 44 and the supports 43, from the forward end of the plate, until it contacts with the forward end of the movable plate 47, said plate having first been moved rearwardly, by pulling on the handles 53, until it contacts with the inclined ends of the plates 40 and 41, and the rotating bar 51 is then rotated bending the metal back at the proper point, which obviously is predetermined by the thickness of the volume. This bent portion of the back is then doubled back on itself, as shown in Figure 10, and the opposite end of the back is then treated in a similar manner. We now have a back which, when the formation thereof is completed, is of the proper width for the volume, and enough metal to bend at right angles for flanges on each side thereof. This back thus far formed is completed in the following manner. The movable plate 47 is pushed forward and the swinging weighted lever 50 seated in its orifice 49. This obviously fixes the position of the movable plate. The metal back is then again thrust between the plate 44 and the supports 43 until it contacts with the forward end of the plate 47 and the rotating lever is operated to form a flange for the back at right angles to the main portion thereof. The other end of the back is similarly treated and will then be of the form indicated by the dotted lines in Figure 10, and ready to be fitted to the volume, and of the proper size therefor.

The numeral 54 indicates an evener board rotatably mounted to the standards 14 and 19 so that when in operative position it is vertical and contacting with the forward extremities of the plates 25 and 38 and I provide locking means to hold the evener board in this position. When not in operation it can be elevated as shown.

Mounted for upward and downward movement between the standards 13 and 14, and the standards 18 and 19, is a cross bar 55 its ends extending on each side beyond its respective standards, and extending upwardly from each of its ends I have provided a rack 56 designed to mesh with, and be operated by, a gear wheel 57, rotatably mounted to the outside of its respective cross bar 15 and 20. These gear wheels are exactly similar in every respect, as are also the racks. Levers 58 extend from the gear wheels and are rigidly affixed thereto, and these levers are joined by a cross bar 59. On the under surface of the cross bar 55 are a plurality of projections 60, each with a recess of given diameter in its center, said lugs being designed to register with, and pass through, their respective orifices 39, for purposes hereinafter set forth.

The numeral 61 indicates a cross bar mounted for upward and downward movement between the standards 13 and 14 and the standards 18 and 19, and near the lower ends thereof, said cross bar projecting at each end beyond its respective standards, and having a gear wheel 62 rotatably mounted thereon. A lever 63 extends from each gear wheel and they are joined by a cross bar 64. The gear wheels 62 operate on racks 65 secured, as shown, in proper position therefor. On the upper surface of the cross bar 61 are a plurality of projections 66, each with a centrally located recess 67 of given diameter in its upper surface said projections being designed to register with, and pass through, their respective orifices 26 in the plate 25, for purposes hereinafter to be set forth.

The numerals 68 Fig. 11 indicate leaf springs secured to the receiving platform 22 and designed to contact with the cross bar 61, when it is elevated, and to constitute a tension against same to hold it in elevated position.

The numeral 69 indicates the auxiliary implement I employ to hold a nail 70 in proper position for driving, said implement being practically a set of pliers with mating recesses 71 to form a channel, when the pliers are closed, to receive, and guide the nail to be driven. Lugs 72, on the mating jaws of the pliers are designed to mate to form a lug to fit within one of the orifices in the plates.

In practical operation the evener board being locked in its vertical position the lower cover of a volume to be formed is placed upon the receiving platform 22, its forward end contacting with the evener board. The sheets to form the volume are then placed in position thereon and the upper cover in position on the top of them, all of these obviously, contacting with the evener board. The pressure bar 27 is then lowered and forced against the assembled covers and sheets and firmly holds them in position. The evener board is then elevated. As before explained, the back is then formed and the flanges thereof forced from the front part of the machine over the covers of the book the upper flange entering the space between the beveled plate 25 and the lower cover. The back is then forced to its seat and is in proper position to be secured to the volume under construction.

A nail 70 is then grasped by the pliers 69 and the lug 72 seated in one of the orifices 39, the nail being free to move within the channel in the pliers and having its pointed end resting on the upper flange of the back. The cross bar 55 is then lowered until the head of the nail is seated in the recess in its lug 60. By this arrangement it is obvious the nail is held in a true vertical position from which it cannot move during the driving operation. Pressure, sufficient to drive the nail through the back and upper cover and into the volume as far as it can go, is then applied through the cross bar 59 being forced downwardly, thereby rotating the levers 58 and forcing the racks 56, carrying the cross bar 55, downward. The cross bar 55 is then elevated and the operation repeated for as many nails as it is desired to drive through the upper part of the volume. It is also obvious I can drive several nails simultaneously by the employment of an equal number of guiding pliers.

Nails are driven upwardly through the lower flange of the back, the lower cover, and as far upwardly into the volume as they will go, in the same manner as explained, except the driving from below is accomplished through the medium of the cross bar 61 and its projections 66, and the orifices 26. It will be recalled that the orifices 26 and the orifices 39 are out of register, so that nails driven from above and nails driven from below will be off-set.

When the nails have been driven from above and below the pressure bar is then elevated and the volume withdrawn. The nails may then be struck with a hammer to seat them more firmly, if such is found desirable, although it is seldom, if ever, necessary.

Having thus described my invention what I claim and desire to secure by Letters Patent of the United States is:

1. In a binding machine designed to employ nails as a securing means for the volume to be bound, an upper presser plate provided with orifices designed to contact with the top of the volume, an upper driver bar provided with projections designed to register with and fit within their respective orifices in the upper presser plate, each projection having a centrally located recess to position a nail, means to operate said upper driver bar, a lower presser plate designed to contact with the under side of the volume and provided with orifices out of register with the orifices in the upper presser plate so that nails driven upwardly will not contact with the downwardly driven nails, a lower driver bar provided with projections to register with and fit within the orifices in the lower presser plate, each projection having a centrally located recess to position a nail and means to operate the lower driver bar.

2. In a binding machine designed to employ nails as a securing means for the volume to be bound, an upper presser plate provided with orifices designed to contact with the top of the volume, an upper driver bar provided with projections designed to register with and fit within their respective orifices in the upper presser plate, each projection having a centrally located recess to position a nail, means to operate said upper driver bar, a lower plate designed to contact with the under side of the volume and provided with orifices out of register with the orifices in upper presser plate so that the nails driven downwardly will not contact with the upwardly driven nails, a lower driver bar provided with projections to register with and fit within the orifices in the lower presser plate, each of said projections having a centrally located recess to position a nail, means to retain the lower presser bar in elevated position and means to operate said lower presser bar.

3. In a binding machine designed to employ nails as a securing medium, means permitting the positioning of nails in true right angular position in contact with the volume to be bound, said means positioning the nails both above and below the volume to be bound and so positioning the nails relative to each other that the downwardly driven nails will be out of register with the upwardly driven nails and means to drive all of said nails.

4. In a binding machine designed to employ nails as a securing medium for the volume, presser plates with orifices therein designed to contact with the upper and lower surfaces of the volume, said presser plates having their forward ends beveled outwardly from the volume to receive the flanges of the back over the covers to a point beyond the line of the orifices in the presser plates, and means to drive binding nails downwardly through the orifices in the upper presser plate and means to drive binding nails upwardly through the orifices in the lower presser plate, all of said nails passing through their respective side of the back and their respective cover and more than half way through the volume, substantially as shown and described.

In testimony whereof I have signed the foregoing specification.

CHARLES F. McBEE.

Witnesses:
L. D. Vore,
H. R. Ramsey.